United States Patent
Boggs et al.

(10) Patent No.: US 12,347,139 B2
(45) Date of Patent: Jul. 1, 2025

(54) HIGH-CONFIDENCE OPTICAL HEAD POSE CORRESPONDENCE MAPPING WITH MULTIPLE LOWER-DENSITY MARKERS FOR HIGH-INTEGRITY HEADTRACKING ON A HEADWORN DISPLAY (HWD)

(71) Applicant: Rockwell Collins, Inc., Cedar Rapids, IA (US)

(72) Inventors: Christopher M. Boggs, Gainesville, VA (US); William T. Kirchner, Ashburn, VA (US); Gavin P. Haentjens, Arlington, VA (US); Kurt I. Jaeger, Catlett, VA (US); Brandon E. Wilson, Portland, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 393 days.

(21) Appl. No.: 17/895,853

(22) Filed: Aug. 25, 2022

(65) Prior Publication Data
US 2023/0222689 A1 Jul. 13, 2023

Related U.S. Application Data

(63) Continuation-in-part of application No. 17/685,032, filed on Mar. 2, 2022, which is a continuation-in-part
(Continued)

(51) Int. Cl.
G06T 7/70 (2017.01)
G06F 3/01 (2006.01)
G06T 7/73 (2017.01)

(52) U.S. Cl.
CPC .............. *G06T 7/74* (2017.01); *G06F 3/012* (2013.01); *G06T 2207/30196* (2013.01); *G06T 2207/30204* (2013.01)

(58) Field of Classification Search
CPC .. G06T 7/74; G06T 2207/30196; G06F 3/012
See application file for complete search history.

(56) References Cited

U.S. PATENT DOCUMENTS

| 5,645,077 A | 7/1997 | Foxlin |
| 5,812,257 A | 9/1998 | Teitel et al. |

(Continued)

FOREIGN PATENT DOCUMENTS

| CA | 3058955 C | 5/2022 |
| EP | 1203285 A1 | 5/2002 |

(Continued)

OTHER PUBLICATIONS

Extended European Search Report dated May 12, 2023; European Application No. 23150052.1.
(Continued)

*Primary Examiner* — Sam Bhattacharya
(74) *Attorney, Agent, or Firm* — Suiter Swantz IP

(57) ABSTRACT

A system and method for high integrity head pose estimation receives a 2D image including medium-density fiducials and low-density fiducials. The system then detects the medium-density fiducials and compares them with a 3D constellation to form an initial head pose estimate. The initial head pose estimate is then checked for possible alternative correspondences. A selection from a set of candidate initial head pose estimates is made to determine. The selected head pose estimate then has search areas established for the medium-density fiducials and low-density fiducials. The system then determines whether or not the head pose is valid and accurate based on whether or not the fiducials appear in their respective search areas.

19 Claims, 14 Drawing Sheets

Related U.S. Application Data of application No. 17/573,283, filed on Jan. 11, 2022, now Pat. No. 12,136,234.

(56) References Cited

U.S. PATENT DOCUMENTS

| | | |
|---|---|---|
| 6,162,191 A | 12/2000 | Foxlin |
| 6,176,837 B1 | 1/2001 | Foxlin |
| 6,311,129 B1 | 10/2001 | Lin |
| 6,361,507 B1 | 3/2002 | Foxlin |
| 6,377,401 B1 | 4/2002 | Bartlett |
| 6,408,245 B1 | 6/2002 | An et al. |
| 6,409,687 B1 | 6/2002 | Foxlin |
| 6,449,559 B2 | 9/2002 | Lin |
| 6,474,159 B1 | 11/2002 | Foxlin et al. |
| 6,480,152 B2 | 11/2002 | Lin et al. |
| 6,658,354 B2 | 12/2003 | Lin |
| 6,681,629 B2 | 1/2004 | Foxlin et al. |
| 6,738,714 B2 | 5/2004 | McCall et al. |
| 6,786,877 B2 | 9/2004 | Foxlin |
| 6,820,025 B2 | 11/2004 | Bachmann et al. |
| 7,000,469 B2 | 2/2006 | Foxlin et al. |
| 7,046,215 B1 | 5/2006 | Bartlett |
| 7,266,446 B1 | 9/2007 | Pelosi |
| 7,301,648 B2 | 11/2007 | Foxlin |
| 7,395,181 B2 | 7/2008 | Foxlin |
| 7,409,290 B2 | 8/2008 | Lin |
| 7,640,106 B1 | 12/2009 | Stokar et al. |
| 7,672,781 B2 | 3/2010 | Churchill et al. |
| 8,019,538 B2 | 9/2011 | Soehren et al. |
| 8,165,844 B2 | 4/2012 | Luinge et al. |
| 8,953,154 B2 | 2/2015 | Galea et al. |
| 8,965,736 B2 | 2/2015 | Horton et al. |
| 9,031,809 B1 | 5/2015 | Kumar et al. |
| 9,478,141 B2 | 10/2016 | Revell et al. |
| 9,569,668 B2 | 2/2017 | Schertler |
| 9,779,550 B2 | 10/2017 | Tobita |
| 9,891,705 B1 | 2/2018 | Lahr et al. |
| 10,216,265 B1 | 2/2019 | Kirchner et al. |
| 10,597,168 B2 | 3/2020 | Boada-Bauxell et al. |
| 10,664,989 B1 | 5/2020 | Goslin et al. |
| 10,775,881 B1 | 9/2020 | Lahr et al. |
| 10,909,715 B1 | 2/2021 | Boggs et al. |
| 11,036,453 B1 | 6/2021 | Jarrett et al. |
| 11,055,875 B2 | 7/2021 | Cramblitt |
| 11,320,650 B1 | 5/2022 | Tiana et al. |
| 11,354,815 B2 | 6/2022 | Suzuki et al. |
| 11,354,868 B1 | 6/2022 | Judd et al. |
| 11,360,552 B1 | 6/2022 | Tiana |
| 11,365,974 B2 | 6/2022 | Mendez et al. |
| 11,880,034 B2 | 1/2024 | Tiana et al. |
| 11,914,763 B1 | 2/2024 | Boggs et al. |
| 2004/0149036 A1 | 8/2004 | Foxlin et al. |
| 2010/0039294 A1 | 2/2010 | Feyereisen et al. |
| 2010/0045701 A1 | 2/2010 | Scott et al. |
| 2013/0234850 A1 | 9/2013 | Lee et al. |
| 2013/0237811 A1 | 9/2013 | Mihailescu et al. |
| 2014/0212000 A1 | 7/2014 | Yagcioglu et al. |
| 2015/0317838 A1 | 11/2015 | Foxlin |
| 2015/0332153 A1 | 11/2015 | Bourdis et al. |
| 2016/0148045 A1 | 5/2016 | Bicer et al. |
| 2017/0358131 A1 | 12/2017 | Weiss et al. |
| 2019/0041979 A1 | 2/2019 | Kirchner et al. |
| 2019/0196198 A1 | 6/2019 | Aymeric et al. |
| 2020/0005448 A1 | 1/2020 | Subramanian et al. |
| 2021/0319709 A1 | 10/2021 | Rose et al. |
| 2022/0050290 A1 | 2/2022 | Fortin-Deschênes et al. |
| 2023/0100979 A1 | 3/2023 | Wan et al. |
| 2023/0110716 A1 | 4/2023 | Fletcher et al. |

FOREIGN PATENT DOCUMENTS

| | | |
|---|---|---|
| EP | 1157326 B1 | 10/2002 |
| EP | 2201532 B1 | 2/2012 |
| EP | 3690734 A1 | 8/2020 |
| EP | 3668792 A4 | 8/2021 |
| EP | 3864491 A1 | 8/2021 |
| WO | 2017042578 A1 | 3/2017 |

OTHER PUBLICATIONS

Extended European Search Report dated May 10, 2023; European Application No. 23151205.4.

Chatterji, G.B. et al: "GPS/machine vision navigation system for aircraft", IEEE Transactions on Aerospace and Electronic Systems, IEEE Service Center, Piscataway, NJ, US, vol. 33, No. 3, Jul. 1, 1997, pp. 1012-1025.

Extended European Search Report dated Jun. 16, 2023; European Application No. 23150030.7.

Pieniazek, Jacek: "Measurement of aircraft approach using airfield image", Measurement, vol. 141, Jul. 1, 2019, pp. 396-406.

Tonhuser, Christian et al: "Integrity Concept for Image-Based Automated Landing Systems", PNT 2015—Proceedings of the ION 2015 Pacific PNT Meeting, The Institute of Navigation, 8551 Rixlew Lane, Suite 360, Manassas, VA 20109, USA, Apr. 23, 2015, pp. 733-747.

Calhoun, Sean M. et al: "Integrity determination for a vision based precision relative navigation system", 2016 IEEE/ION Position, Location and Navigation Symposium (Plans), IEEE, Apr. 11, 2016, pp. 294-304.

Extended European Search Report dated Jun. 22, 2023; European Application No. 23150358.2.

Frisch Gabriel et al: "High Integrity Lane Level Localization Using Multiple Lane Markings Detection and Horizontal Protection Levels", 2018 15th International Conference on Control, Automation, Robotics and Vision (ICARCV), IEEE, Nov. 18, 2018, pp. 1496-1501.

Hecker P. et al: "Optical Aircraft Positioning for Monitoring of the Integrated Navigation System during Landing Approach", Gyroscopy and Navigation, Pleiades Publishing, Moscow, vol. 10, No. 4, Oct. 1, 2019, pp. 216-230.

Alcantara, et al., (2011). Alternative Position, Orientation and Data Recognition Algorithms for Augmented Reality Markers. Retrieved at https://www.researchgate.net/publication/267246987_ALTERNATIVE_POSITION_ORIENTATION_AND_DATA_RECOGNITION_ALGORITHMS_FOR_AUGMENTED_REALITY_MARKERS.

Cai, Xingcheng. A Prototype Helmet Fitting System for Concussion Protection. Diss. M. Sc. thesis, School of Computing, Queen's University, Kingston, Ontario, Canada, 2015. (Year:2015).

Extended Search Report in European Application No. 181870114 dated Jan. 7, 2019, 10 pages.

Ferrin F J: "Survey of Helmet Tracking Technologies", Visual Communications and Image Processing; Jan. 20, 2004-Jan. 20, 2004; San Jose, vol. 1456, Feb. 26, 1991 (Feb. 26, 1991), pp. 86-94, XP000578495, DOI:10.1117/12.45422, ISBN: 978-1-62841-730-2.

812 — Determining, based on one or more of the initial head pose estimate or the initial error bound, one or more search areas within the 2D image data 814 — Detecting, within the one or more search areas, at least one of a medium-density fiducial of the constellation or a low-density fiducial of a plurality of low-density fiducials, each low-density fiducial associated with a common identifier detectable within the environment 816 — Refining one or more of the initial head pose estimate or the initial error bound based on the at least one detected medium-density fiducial or low-density fiducial

*FIG. 8B*

HIGH-CONFIDENCE OPTICAL HEAD POSE CORRESPONDENCE MAPPING WITH MULTIPLE LOWER-DENSITY MARKERS FOR HIGH-INTEGRITY HEADTRACKING ON A HEADWORN DISPLAY (HWD)

CROSS REFERENCE TO RELATED APPLICATIONS

This application relates to U.S. Pat. No. 10,909,715B1, filed Jan. 31, 2019, titled HIGH-INTEGRITY OPTICAL HEAD POSE ESTIMATION USING CODED FEATURES, which discloses determining a head pose using a single, high-density fiducial, naming Christopher M. Boggs, William T. Kirchner, and Ankur Ankur as inventors, which is hereby incorporated by reference in its entirety.

This application relates to U.S. patent application Ser. No. 17/573,283, filed Mar. 2, 2024, titled VISION-BASED NAVIGATION SYSTEM INCORPORATING MODEL-BASED CORRESPONDENCE DETERMINATION WITH HIGH-CONFIDENCE AMBIGUITY IDENTIFICATION, naming Christopher M. Boggs, Robert B. Anderson, Weston J. Lahr, and Richard M. Rademaker as inventors, which is hereby incorporated by reference in its entirety.

This application relates to U.S. patent application Ser. No. 17/685,032, filed Mar. 2, 2024, titled VISION-BASED NAVIGATION SYSTEM INCORPORATING HIGH-CONFIDENCE ERROR OVERBOUNDING OF MULTIPLE OPTICAL HEAD POSES, naming Christopher M. Boggs, Robert B. Anderson, Weston J. Lahr, and Richard M. Rademaker as inventors, which is hereby incorporated by reference in its entirety.

TECHNICAL FIELD

The subject matter disclosed herein is directed generally to head-worn display (HWD) systems for aircraft pilots, and more particularly to head tracking systems for estimating head pose of the pilot wearing the HWD.

BACKGROUND

For display of an accurately aligned presentation on a Head Worn Display (HWD) or Helmet Mounted Display (HMD), the HWD must properly convert flight guidance cues into the head reference frame to allow pilot to virtually and accurately "see" a displayed presentation. In order for the HWD to accurately present the guidance cues, the HWD must be aligned to determine a relative position and orientation of the wearer's head, e.g., a head pose, to display the information in the accurate position on the HWD. If an inaccurate head pose is used to convert safety-critical data in the head frame, the data may likewise be displayed inaccurately, potentially including Hazardously Misleading Information (HMI) associated with a safety risk.

Traditionally, one or more high-density fiducials have been used to determine head pose of a pilot. The need for a high-integrity optical head pose via a sufficient correspondence integrity resulted in the use of high-density fiducials, which incorporate a sufficiently dense amount of encoded information so as to appear individually distinct from other fiducials as well as from patterns in the background.

However, higher information density fiducials may result in lower detectability. Detectability of fiducials is determined in part by the fiducial's internal features relative to the overall size of the fiducial. As a result, increasing the density of bits within an individual fiducial of consistent size in order to increase correspondence integrity makes these bits and features more difficult to detect.

As detectability of individual fiducials decreases, so does the likelihood of the fiducials being detected by a camera, as it may be more difficult for the camera to capture the distinguishing features of said fiducial with sufficient pixel accuracy. A need remains for a system and method which may overcome these limitations and provide a novel solution to enable high-integrity head pose tracking, without issues resulting from densely packed fiducials that reduce detectability.

Conventionally, an image of a high-density fiducial is captured by a camera and used for pose estimation, e.g., by detecting the relative location of the fiducial in-frame and determining the extent to which the relative location of the fiducial corresponds to a known three-dimensional (3D) position and orientation of that fiducial, e.g., where we know a particular fiducial to be. However, the overall snapshot correspondence integrity requirement is conservatively imposed on each fiducial, as either the fiducial is detected or it is not.

SUMMARY

A system for high-integrity head pose estimation is disclosed. In embodiments, the system includes a helmet, which comprises a head worn display (HWD) and one or more cameras, the cameras configured to capture one or more 2-dimensional (2D) images associated with the HWD. The system includes three or more unique medium-density fiducials and one or more low-density fiducial, where the fiducials are configured to be captured in the one or more 2D images. The system includes one or more memory configured to store program instructions for determining an estimated head pose. The system includes a data storage element configured to store a 3-dimensional (3D) constellation of position and orientation of the three or more medium-density fiducials and the one or more low-density fiducials. The system includes one or more processor, communicatively coupled to the one or more camera, the data storage element, and the one or more memory. In an embodiment, the processor is configured to receive one or more images from the camera, the 3D constellation of the position and the orientation of the three or more medium-density fiducials and the one or more low-density fiducials, and the program instructions, where the processor executes the program instructions to estimate a current head pose.

In some embodiments, the medium-density fiducials of the system are ArUco markers. In an embodiment, the ArUco markers are 4×4 ArUco markers.

A method for high-integrity head pose estimation is also disclosed. In embodiments, the method includes receiving one or more 2D images captured with a camera, where the 2D images comprise three or more unique medium-density fiducials and one or more low density fiducials. The method includes detecting medium-density fiducials within the one or more images and making an initial estimate of a current head pose based on the detectable medium-density fiducials. The method includes determining if the initial estimate of the current head pose is the only feasible correspondence based upon a relationship of the detectable medium-density fiducials and a 3D constellation, where alternative correspondences for the initial estimate invalidate the initial estimation. The method includes selecting an initial head pose estimate from either the ArUco initial estimate of the current head pose, a tightly coupled head pose estimate, or a coasted head pose. The method includes determining a search area in the initial head pose estimate for at least one of the three or more medium-density fiducials or the one or more low density fiducials. The method includes searching the image associated with the initial head pose estimate for the selected three or more medium-density fiducials or the one or more low-density fiducial. The method includes determining whether the three or more medium-density fiducials or the one or more low-density fiducial are within their search area. The method includes accepting the initial head pose estimate as a final head pose estimate if the three or more medium-density fiducials or the one or more low-density fiducial are within their search area or rejecting the initial head pose estimate if three or more medium-density fiducials or the one or more low-density fiducial are not within their search area.

In some embodiments, the medium-density fiducials of the system are ArUco markers. In an embodiment, the ArUco markers are 4×4 ArUco markers.

In some embodiments, the tightly coupled head pose estimate is formed by combing one or more detectable medium-density fiducials and a coasted head pose.

In some embodiments, the tightly coupled head pose is the final head pose estimate.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 8A-8D is a flow diagram depicting steps for forming a head pose estimate, in accordance with example embodiments of this disclosure.

DETAILED DESCRIPTION

Figure 1:
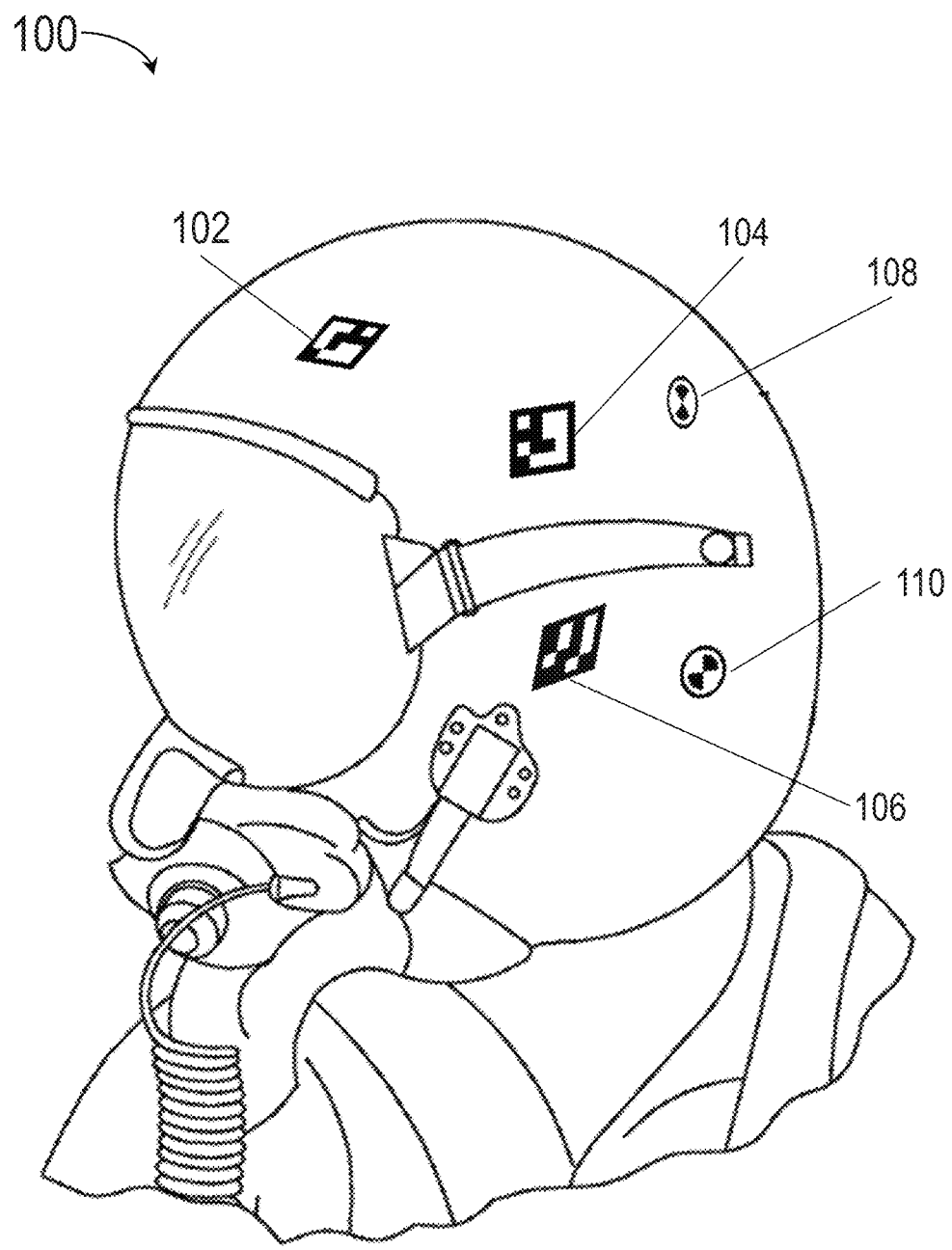
FIG. 1 shows a deployment of medium-density fiducials and low-density fiducials on a helmet, in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for determining a high integrity head pose using optical pose estimation that are reliable for safety critical applications using multiple medium-density fiducials and low-density fiducials. Optical pose refers to the position and orientation of the HWD camera relative to the reference frame of the fiducials. For example, in an inside-out configuration wherein the camera is fixed to an HWD worn by an aircraft pilot and the fiducials are arranged in fixed positions and orientations around the aircraft (e.g., within a cockpit or control area within view of the camera), the optical pose may be in a camera-centered reference frame (camera frame) relative to a fiducial marker-centered reference frame (marker frame). Given a rigid body-head alignment between the camera frame and the head frame, and a platform alignment between the marker frame and a platform frame centered on the aircraft (also called a body frame), a head pose relative to the platform frame may be determined based on the optical pose. Similarly, in an outside-in configuration where the camera or cameras are mounted in the cockpit and oriented toward the wearer, and the fiducials are attached to the head of the wearer, the head pose may be computer given a rigid body-head alignment between the marker and head frames and a platform alignment between the platform and camera frames.

There is a need for high confidence correspondence between points seen in a 2-Dimensional (2D) image and points in a 3-Dimensional (3D) constellation of points of the real world. If the points in the 2D image cannot be precisely mapped to the real-world 3D objects portrayed in the 2D image, a correspondence integrity event (CIE) may result. For example, if there are ambiguities between the 2D location and orientation of fiducials (e.g., fiducials captured by a camera aligned with the current head pose) and the absolute 3D locations of those fiducials, the head tracker cannot determine the current head pose in the 3D reference frame with sufficient integrity for safety critical applications. For safety critical applications, a head pose estimate may be required to have an integrity bound of 1 e-7, i.e., a probability of at most 0.0000001 (0.00001 percent) that the head pose estimate error is large enough to be hazardously misleading. In applications regarding aircraft, these problems, no matter how slight, may have potentially deleterious (e.g., minor, major, hazardous, catastrophic) outcomes. A camera and known markers may be used to estimate an optical pose (e.g., position and orientation) of a HWD based on a correspondence between a 2D image and a known 3D constellation.

When determining a head pose, a camera, or multiple cameras, may capture a 2D image portraying an arrangement of any number of fiducials (e.g., 3 or 4) at a single point in time. The captured image, and the fiducials captured therein, may then be compared to 3D constellation data including the known locations of each fiducial in order to determine a high confidence head pose. The determined head pose may then be used to orient an image displayed on a head worn display (HWD).

Referring to FIG. 1, an environmental view of a helmet 100 including medium-density fiducials 102, 104, 106 and low-density fiducials 108, 110 according to an exemplary embodiment of the inventive concepts disclosed herein is shown. In at least one embodiment, where the helmet 100 is intended for use in a head tracking system (e.g., a head tracker), medium-density fiducials 102, 104, 106 and low-density fiducials 108, 110 are each disposed at defined locations on the helmet, and with defined orientations. Because the medium-density fiducials 102, 104, 106 include coded features, the identity of each medium-density fiducial 102, 104, 106 and their specific locations and orientations are a critical factor. However, because the low-density fiducials 108, 110 do not include coded features (and may be identical to each other), only the specific location of each low-density fiducial 108, 110 is a critical factor. It may be noted, however, that in some embodiments low-density fiducials 108, 110 may convey orientational information as well as positional information.

In embodiments, medium-density fiducials 102, 104, 106 may include encoded identifiers, e.g., binary digits uniquely identifying each fiducial (among all fiducials within the environment throughout which the fiducials are disposed, or among a larger pool of fiducials). For example, a constellation database as discussed below may include, for each medium-density fiducial 102, 104, 106, a unique encoded identifier and a position and orientation relative to a 3D constellation reference frame. In embodiments, a fiducial marker may be "medium-density" in that the complexity of the encoded identifier may be less than that of a conventional high-density fiducial. For example, a high-density fiducial may include an arrangement of 8×8=64 encoded binary digits (each fiducial including a different 8×8 pattern corresponding to a different encoded identifier), while each medium-density fiducial 102, 104, 106 may include, for example, 6×6=36 or even 4×4=16 encoded binary digits.

Additionally, the collection of medium-density fiducials 102, 104, 106 and the low-density fiducials 108, 110 form a constellation of markers. In this constellation, the medium-density fiducials 102, 104, 106 and the low-density fiducials 108, 110 have a specific geometry in that each medium-density fiducial 102, 104, 106 and low-density fiducial 108, 110 has a unique spatial relationship, e.g., a unique relative position and orientation, with every other fiducial. The spatial relationships between a constellation of fiducials may be referred to as a marker geometry of the constellation.

While embodiments of the present disclosure may show the head tracker integrated or used with an HWD in a helmet 100, this example is intended to be illustrative rather than restrictive. For example, the head tracker disclosed herein may be used with any system displaying information to a user, including, but not limited to, a visor, goggles, augmented reality (AR) system, mixed reality (MR) system, virtual reality (VR) system, or the like.

Figure 2:
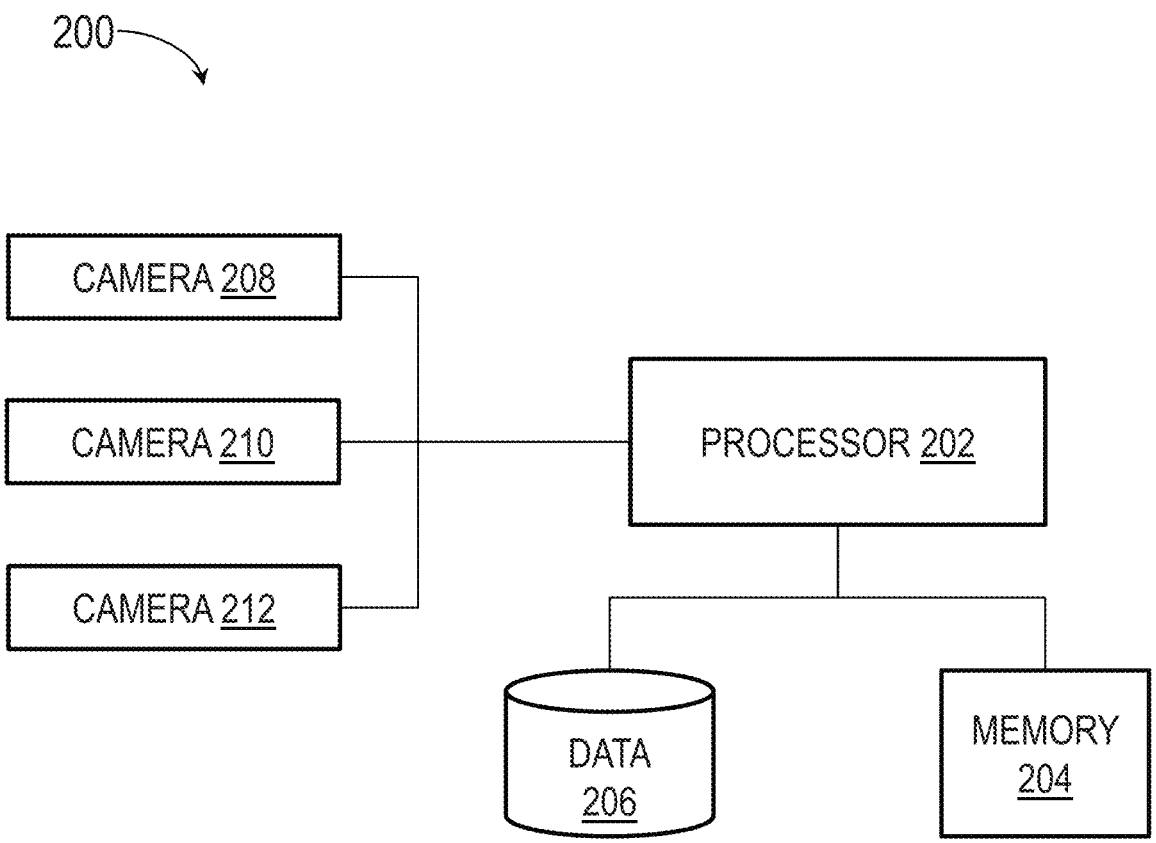
FIG. 2 is a block diagram illustrating a configuration for processing images, in accordance with example embodiments of this disclosure.

Referring to FIG. 2, a block diagram of a system 200 for implementing exemplary embodiments of the inventive concepts disclosed herein is shown. The system 200 includes a processor 202, a memory 204 connected to the processor 202 for embodying processor executable code (e.g., program instructions), a data storage element 206 storing data specific to medium-density fiducials and low-density fiducials (e.g., a constellation database of 3D constellations of points), and one or more cameras 208, 210, 212. The processor 202 is configured to receive images of the medium-density fiducials and low-density fiducials from the one or more cameras 208, 210, 212, retrieve data pertaining to each medium or low-density fiducial from the data storage element 206, and use the data to make determinations about the feasibility and accuracy of a resulting head pose calculation as more fully described herein. In an embodiment, the memory 204 and the data storage element 206 may be a singular element, storing both program instructions and information (e.g., a constellation database) relating to medium-density fiducials and low-density fiducials. The 3D constellation database may include the unique position and/or orientation of each medium-density and low-density fiducial in 3D space (e.g., relative to a common marker frame). The processor 202 may be communicatively coupled to the memory 204, the data storage element 206, and the one or more cameras 208, 210, 212. It will be appreciated that, while some embodiments described herein specifically refer to environmental cameras and medium-density fiducials and low-density fiducials affixed to a helmet (and vice-versa), all of the principles and methodologies disclosed are equally applicable to either type of embodiment.

Figure 3B:
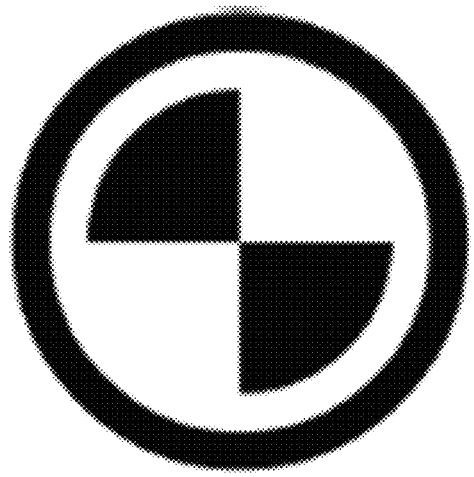
FIG. 3B shows a low-density fiducial, in accordance with example embodiments of this disclosure.
Figure 3A:
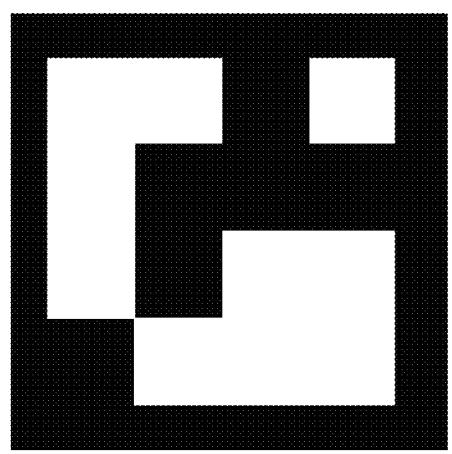
FIG. 3A shows a medium-density fiducial, in accordance with example embodiments of this disclosure.

Referring to FIG. 3A, a medium-density fiducial 302 is shown. In an embodiment, the medium-density fiducials 302 may be an Augmented Reality University of Cordoba (ArUco) marker. For example, the medium-density fiducial 302 may be a 4×4 ArUco marker. In embodiments, each medium-density fiducial 302 may be unique and include an encoded identifier, e.g., bits of information or features that make each medium-density fiducial 302 unique from every other medium-density fiducial 302. For example, the medium-density fiducial 302 may include an encoded pattern decodable to a unique 16-bit binary, e.g., 0111100111001101. The bits of information and features of each medium-density fiducial 302 are used by the processor 202 in conjunction with the method disclosed herein to help determine a high integrity head pose.

Referring to FIG. 3B, a low-density fiducial 304 is shown. Each low-density fiducial 304 may contain no encoded bits in that each low-density fiducial may be indistinct from any other low-density fiducial 304; for example, to the extent that the low-density fiducial includes an encoded pattern, each low-density fiducial approximates the same binary, e.g., 1001. In embodiments, low-density fiducials 304 may be designed to as to be distinct from their background environment and detectable therein, in order to reduce or preclude spurious feature detection, e.g., where a non-fiducial background element is erroneously detected as a fiducial marker. Further, low-density fiducials 304 may additionally convey orientation information. On their own, low-density fiducials 304 are not capable of being used to determine a high-integrity head pose, however, when combined with medium-density fiducials 302, the positions and/or orientations of low-density fiducials may be used to provide a refined head pose solution wherein overall confidence or accuracy may be increased.

Broadly speaking, in embodiments medium-density fiducials 302 may be implemented such that each medium-density fiducial of a set thereof has a significant bit difference between all other fiducials, but not so significant as to meet correspondence integrity requirements on a per-marker basis, as would a high-density fiducial. In embodiments, with respect to medium-density fiducials, correspondence integrity may be determined based on a combination of encoded marker identifiers and feasible marker geometry. For example, is a relative position of a fiducial or constellation thereof (or a portion of said constellation) as captured by an image feasible, given the known poses of each fiducial and the marker geometry (e.g., relative marker poses) of the constellation? In embodiments, with respect to low-density fiducials 304, correspondence integrity may be established based on high-confidence search areas within the image, and a low probability of spurious feature detection therein. For example, if a feature is detected within a high-confidence search area of a captured image, it must be a low-density fiducial 302 rather than a non-marker.

Figure 4A:
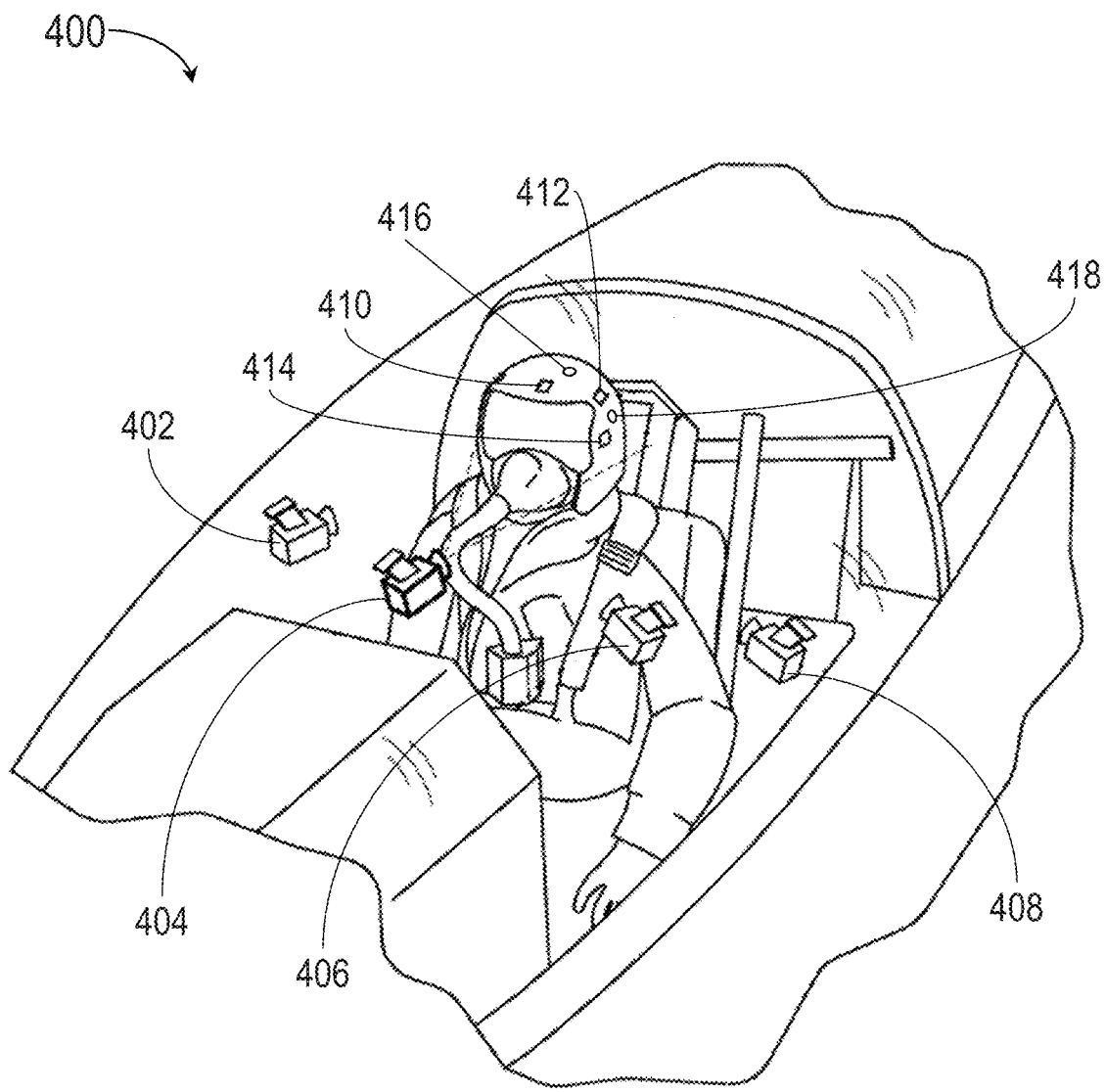
FIG. 4A shows a single camera in a cockpit detecting medium-density fiducials and low-density fiducials on a pilot's helmet, in accordance with example embodiments of this disclosure.
Figure 4B:
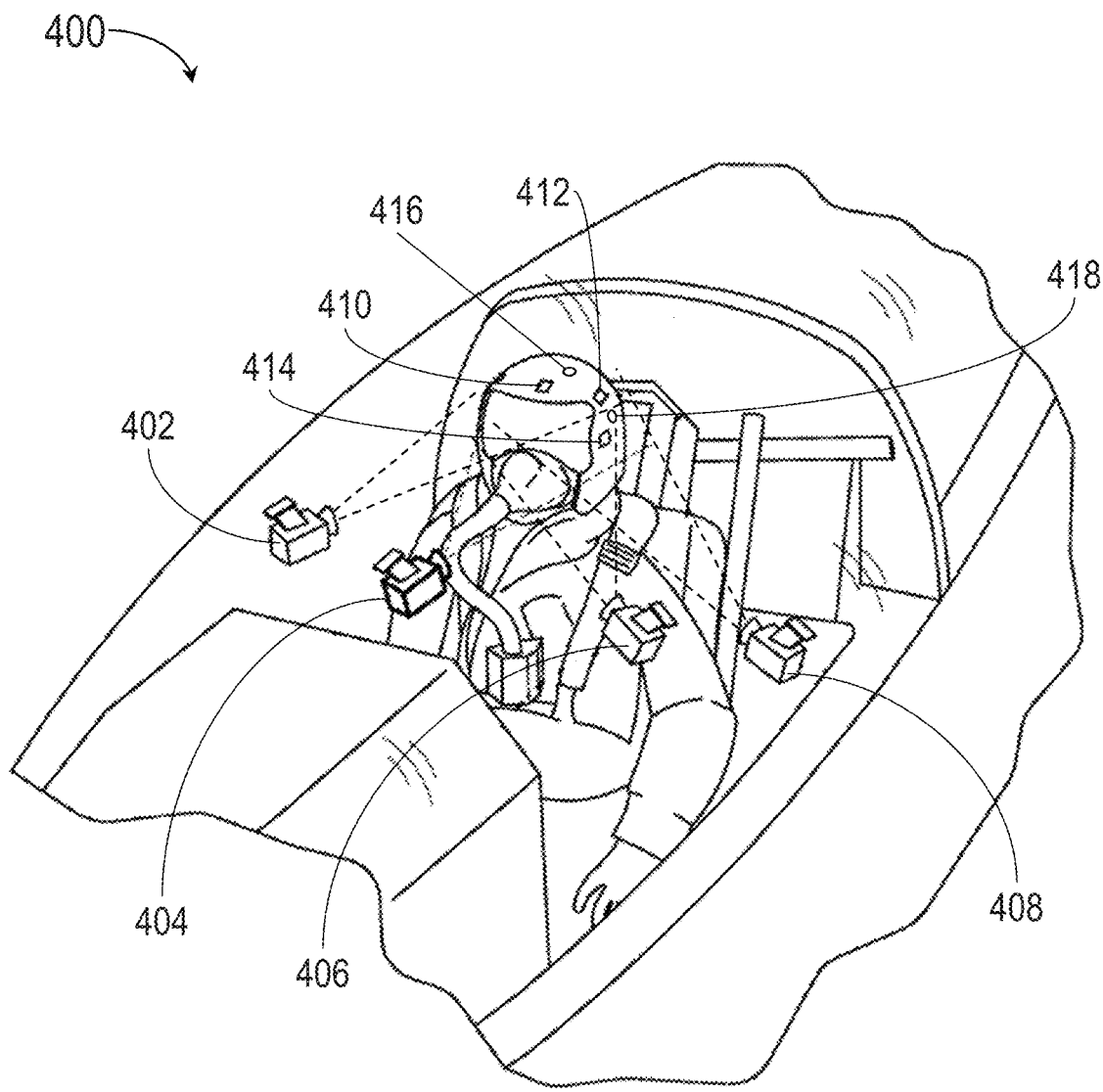
FIG. 4B shows multiple cameras in a cockpit detecting medium-density fiducials and low-density fiducials on a pilot's helmet, in accordance with example embodiments of this disclosure.
Figure 4C:
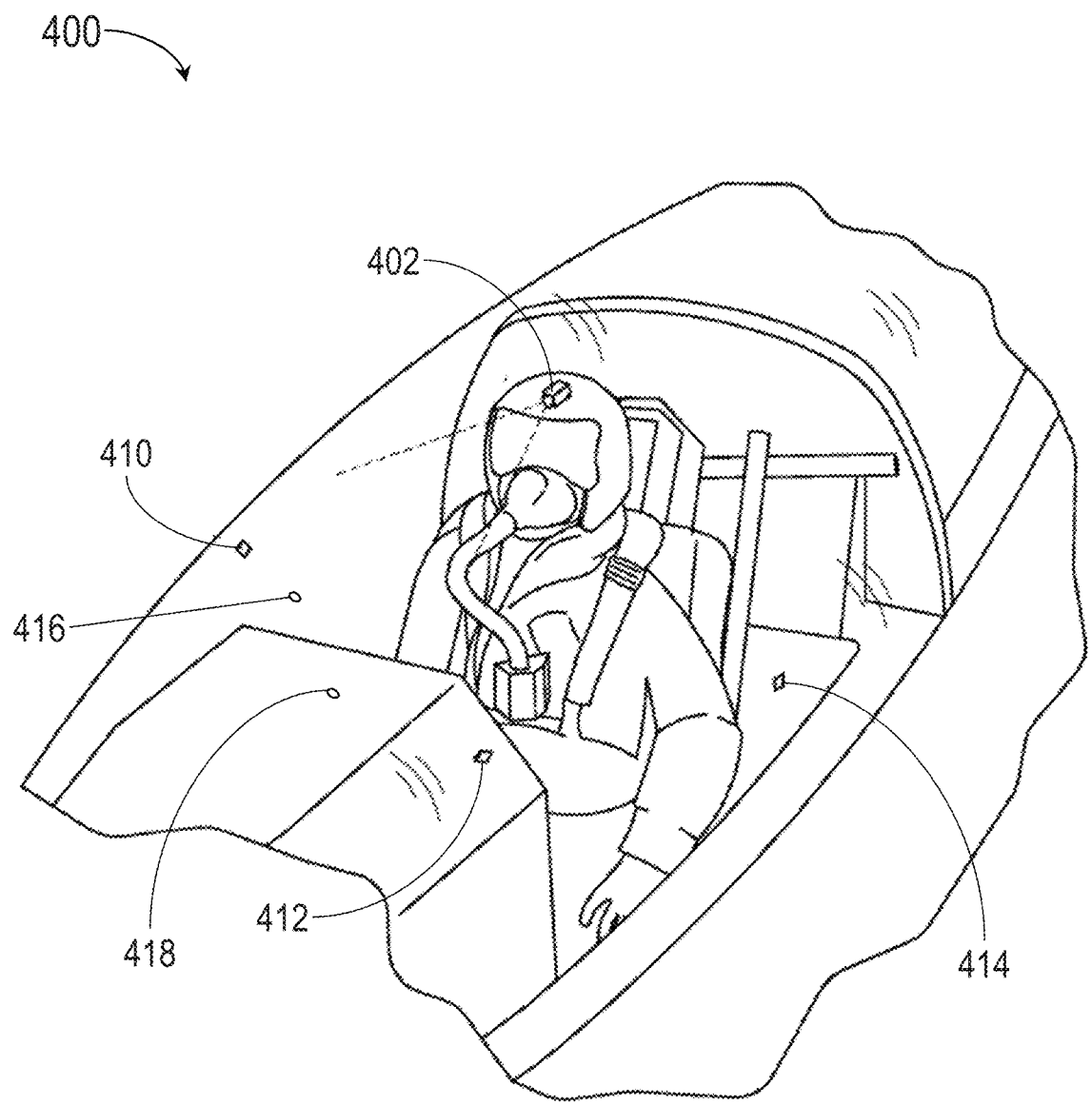
FIG. 4C shows a camera on a helmet detecting medium- and low-density fiducials placed in the cockpit, in accordance with example embodiments of this disclosure.

Referring now to FIGS. 4A, 4B, and 4C, environmental views of an aircraft cockpit 400 including exemplary embodiments of the inventive concepts disclosed herein are shown.

Referring to FIGS. 4A and 4B, an aircraft cockpit 400 including one or more cameras 402, 404, 406, 408 is shown. Three or more medium-density fiducials 410, 412, 414 and one or more low-density fiducial 416, 418 are dispersed on a helmet. Each medium-density fiducial 410, 412, 414 may comprise a unique set of coded features, e.g., a unique encoded identifier. Similarly, each medium-density fiducial 410, 412, 414 may have a known 3D position and orientation in a common marker frame, as cataloged in the 3D constellation database stored to data storage (206, FIG. 2). In embodiments (as shown by FIG. 4A), a single camera 404 may detect the three or more medium-density fiducials 410, 412, 414 and one or more low-density fiducial 416, 418. In another embodiment (depicted in FIG. 4B) multiple cameras 402, 404, 406, 408 may each capture part of the three or more medium-density fiducials 410, 412, 414 and one or more low-density fiducials 416, 418 and combine their image data in order to allow a processor 202 to perform a head pose estimation based on a composite image. A system where fiducials are disposed on a helmet 100 and cameras 402, 404, 406, 408 are mounted in a cockpit 400 may be referred to as an outside-in approach to a head tracking system.

Referring to FIG. 4C, an alternative embodiment is shown. While in FIGS. 4A and 4B, one or more cameras 402, 404, 406, 408 are dispersed around an aircraft cockpit 400, FIG. 4C depicts one or more cameras 402 mounted on a helmet. In this instance, the three or more medium-density fiducials 410, 412, 414 and one or more low-density fiducials 416, 418 are dispersed in an aircraft cockpit 400. An embodiment of the head tracking system 200 wherein a camera 402 is mounted on a helmet 100, or otherwise to the HWD, and fiducials are located throughout the cockpit 400 (e.g., within the field of view of the camera 402) may be referred to as an inside out implementation of the head tracking system.

In embodiments, each of the medium-density fiducials 410, 412, 414 and the low-density fiducials 416, 418 may be associated with a fixed 3D position and/or orientation. The fixed 3D position and/or orientation of each medium-density fiducial 410, 412, 414 and the low-density fiducial 416, 418 may be found in a 3D constellation database stored in the data storage element 206; for example, the constellation database may be referenced to determine or validate a head pose estimate as described below.

Figure 5:
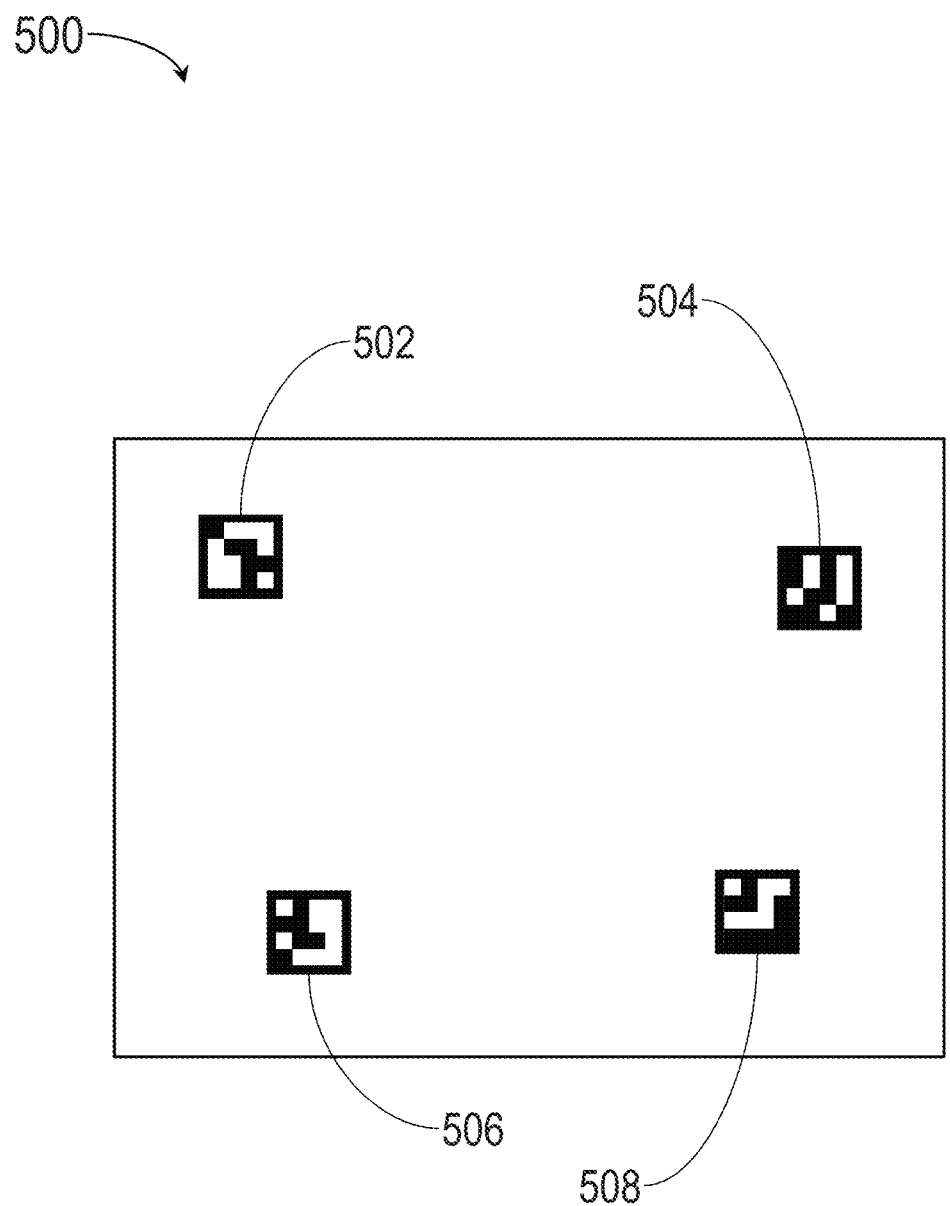
FIG. 5 shows a 2D image of multiple medium-density fiducials, in accordance with example embodiments of this disclosure.

Referring to FIG. 5, a first part of a fiducial layout 500 (e.g., an image or portion thereof captured by the camera (402, FIG. 4A-C) for estimating a head pose from three or more medium-density fiducials 502, 504, 506, 508 is depicted. In embodiments, each of the four depicted medium-density fiducials 502, 504, 506, 508 are unique from each other and dispersed at relative locations (e.g., and/or orientations) within the captured 2D image.

In embodiments, when solving for head pose, each of the medium-density fiducials 502, 504, 506, 508 may be considered as a constellation as well as individually. For example, considered as a collective constellation, the collection of medium-density fiducials 502, 504, 506, 508 may have a greater number of usable bits of information than a single high-density fiducial as well as a unique marker geometry. Further, because the amount of information stored in each medium-density fiducial 502, 504, 506, 508 has been decreased relative to a high-density fiducial, each medium-density fiducial 502, 504, 506, 508 may be more detectable generally than a high-density fiducial.

When solving for head pose using a collection of medium-density fiducials 502, 504, 506, 508, the head pose estimate may be a high integrity head pose estimate, but the head pose estimate may not reach the desired level of accuracy. In embodiments, further refinement of the initial head pose estimate may be required in order to achieve an estimate with sufficient integrity for a certain application.

Figure 6:
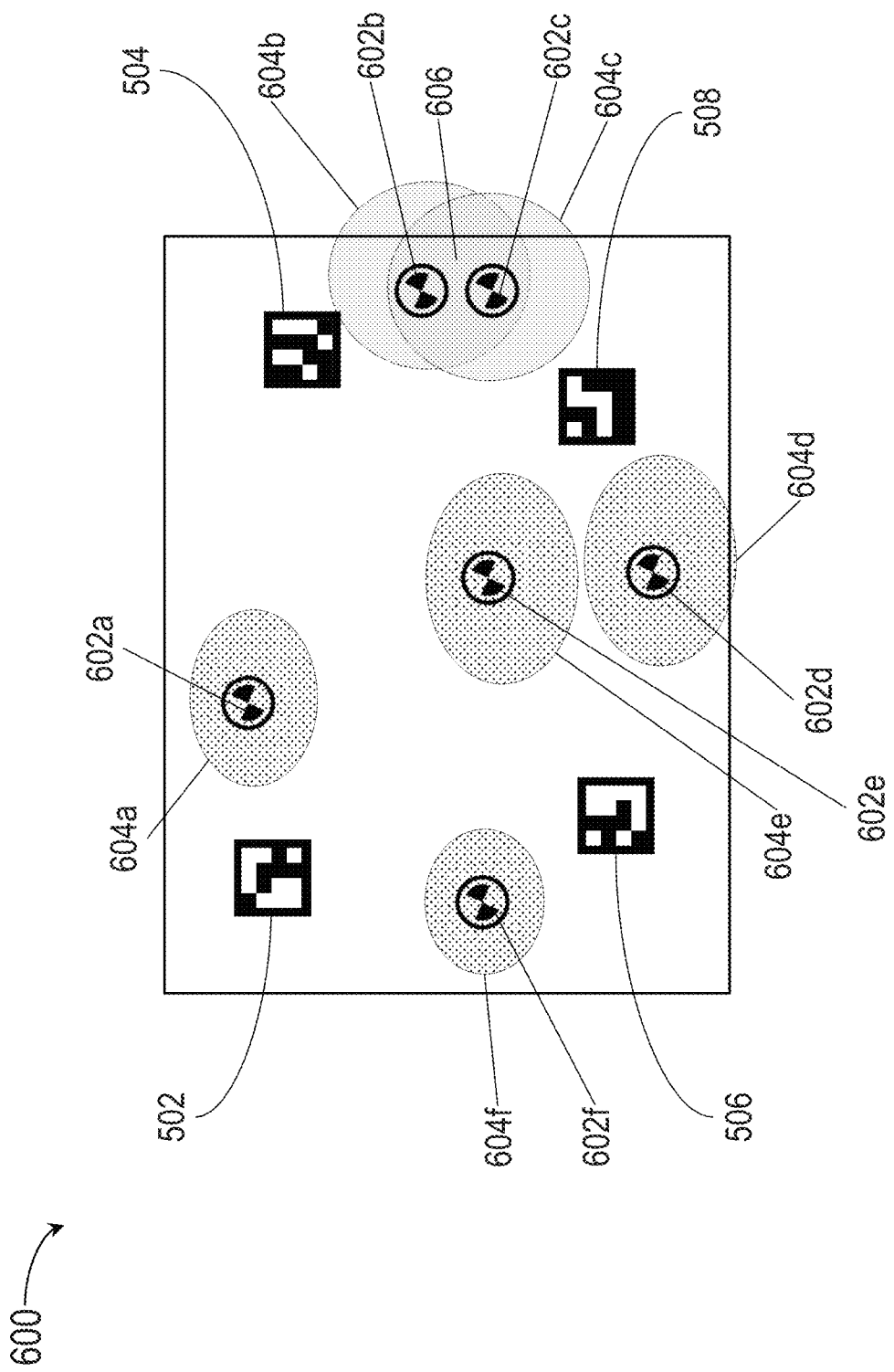
FIG. 6 shows a 2D image of multiple medium-density fiducials and low-density fiducials, with search areas defined for the low-density fiducials, in accordance with example embodiments of this disclosure.

Referring to FIG. 6, the fiducial layout 600 may be implemented and may function similarly to the fiducial layout 500 of FIG. 5, except that within the fiducial layout 600, in addition to the four unique medium-density fiducials 502, 504, 506, 508, a plurality of low-density fiducials 602a-602f and/or search areas 604a-604f may also be detected based on the initial head pose estimate. For example, unlike the medium-density fiducials 502, 504, 506, 508, the low-density fiducials 602a-602f may be indistinct from one another in terms of their interior features and/or relative orientation. 602 In embodiments, each search area 604a-604f (e.g., image region, pixel location) may be associated with a high-confidence head pose error bound indicative of a range where each low-density fiducial 602a-602f should be located. It should be noted, though it is not shown, that in embodiments an associated search area may be calculated for each of the medium-density fiducials 502, 504, 506, 508, as well as for each of the low-density fiducials 602a-f.

In embodiments, the low-density fiducials 602a-f may be used together with the initial head pose estimate based on detected medium-density fiducials 502, 504, 506, 508 to obtain a high integrity, high accuracy head pose estimate When using low-density fiducials 602a-f to improve, refine, accept, or reject an initial head pose estimate, there may be a region of ambiguity 606 with respect to the search areas 604a-f. In a region of ambiguity 606 two or more search areas 604b, 604c may overlap, which would mean that two or more low-density fiducials 602b, 602c could each be present in the region of ambiguity 606. In a situation where there is a region of ambiguity 606, it is possible for the system confuse two or more low-density fiducials 602b, 602c, unable to distinguish one fiducial from the other.

In embodiments, when a region of ambiguity 606 exists, the system 200 may either disregard, or attempt to resolve, the ambiguity. For example, the system 200 may have enough data and measurements to discard any ambiguous features detected within the region of ambiguity 606 without any negative consequences with respect to the accuracy or integrity of the estimated head pose. Alternatively, the system 200 may also track the low-density fiducials 602b, 602c and the region of ambiguity 606 as alternative hypotheses, performing a first correspondence calculation with one low-density fiducial 602b, a second correspondence calculation with the other low-density fiducial 602c, and assessing both correspondence ambiguities for feasibility or viability. In embodiments, where multiple feasible correspondences remain, the set of feasible correspondence ambiguities may be tracked in a similar manner to U.S. patent application Ser. No. 17/685,032, which application is hereby incorporated by reference in its entirety.

In embodiments, the feasibility of each of a set of correspondence ambiguities may be determined via reprojection. For example, a captured 2D image corresponding to the fiducial layouts 500, 600 of FIGS. 5 and 6 may be reprojected onto a corresponding 3D constellation data 704. Further, a chi-squared hypothesis test may be performed to determine if the reprojected medium-density fiducials 502, 504, 506, 508 are feasible or too extreme to accept.

In embodiments, the set of search regions 604a-604f may serve as an error bound for the set of all feasible correspondence ambiguities. For example, as noted above, a search region 604b-604c may feasibly correspond to one or more low-density fiducials 602b-602c. Alternatively, a single low-density fiducial 602c may feasibly correspond to multiple search regions 604b-604c, but it may impossible to determine with sufficient confidence to which of the possible search regions the low-density fiducial corresponds. Accordingly, a set of conditional pose solutions may be determined including a feasible head pose solution corresponding to each feasible correspondence ambiguity, e.g., based on said correspondence being the correct correspondence. Further, the set of conditional pose solutions may include a containment pose error bound, bounding the probability that the set of feasible correspondence ambiguities includes the correct correspondence (e.g., and the candidate head pose solution based on said correct correspondence).

In embodiments, the initial head pose estimate with high confidence error bounds, which may be used in turn to determine the search regions 604a-604f, may be determined in several ways. For example, a snapshot head pose estimate may be based on medium-density fiducials 502, 504, 506, 508 detected within a single frame or captured 2D image. For example, the snapshot head pose estimate may be used without reference to historical position information or image data. In embodiments, while the snapshot head pose estimate may provide a high integrity solution, the snapshot head pose estimate may not have the desired accuracy. For example, the accuracy of the snapshot head pose estimate may be increased by detecting the low-density fiducials 602a-f within their corresponding search areas 604a-f.

In some embodiments, the initial head pose estimate may also be determined via a coasted head pose solution. For example, a previous head pose solution at a previous time of validity may be used as an initial pose estimate for the current time of validity (e.g., either a zero-order hold without rate information or propagated forward in time via extended Kalman filter propagation, as disclosed by U.S. Pat. No. 10,216,265, which Patent is herein incorporated by reference in its entirety). In some embodiments, the use of a coasted solution may introduce additional error that the error bound for the resulting head pose solution must account for. Further, historical information from the coasted solution and information from the current 2D image may be combined in order to calculate a tightly coupled head pose estimate as described below.

In some embodiments, a coasted head pose solution alone may be used to calculate a head pose estimate when no medium-density fiducials 502, 504, 506, 508 are detected in the captured 2D image.

In some embodiments a tightly coupled head pose estimate may be preferable to a snapshot head pose estimate. For example, if an insufficient number of medium-density or low-density fiducials (e.g., medium-density fiducial 502) is detected in a particular 2D image at a given time, it may not be possible to compute a snapshot head pose estimate with sufficient accuracy or confidence. In embodiments, a tightly coupled head pose estimate may be performed based on a coasted head pose solution and an otherwise insufficient number of medium-density fiducials 502, 504, 506, 508 (e.g., less than three) detected in a 2D image. For example, the tightly coupled head pose estimate may be formed by comparing a position of the medium-density fiducials 502 in the 2D image as predicted by the coasted head pose solution with the detected position of the medium-density fiducial within the captured 2D image. For example, the coasted head pose solution may have predicted the location of the detected medium-density fiducial 502 at pixel 150, while the detected medium-density fiducial 502 may have been detected at pixel 250 in the 2D image. In embodiments, the resulting 100-pixel residual may then be used to correct for possible errors in head pose and calculate a tightly coupled head pose estimate. For example, the correction in the head pose estimate may shift the coasted head pose solution such that the location of the medium-density fiducial 502 predicted by the coasted head pose solution becomes close to or aligned with the detected medium-density fiducial 502 of the 2D image.

Figure 7A:
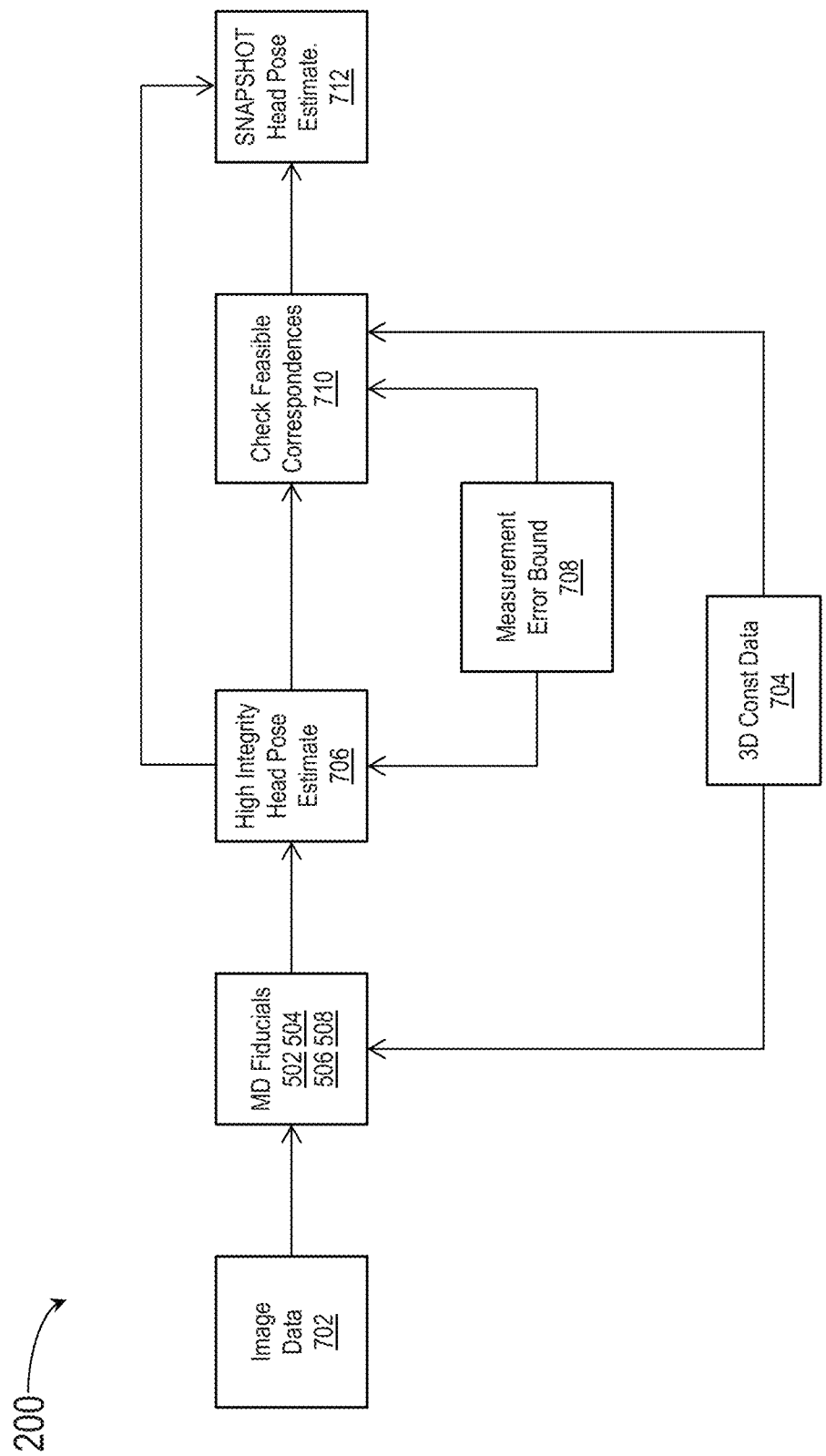
FIG. 7A is a block diagram illustrating the determination of an initial head pose estimate at a current time of validity, in accordance with example embodiments of this disclosure.
Figure 7B:
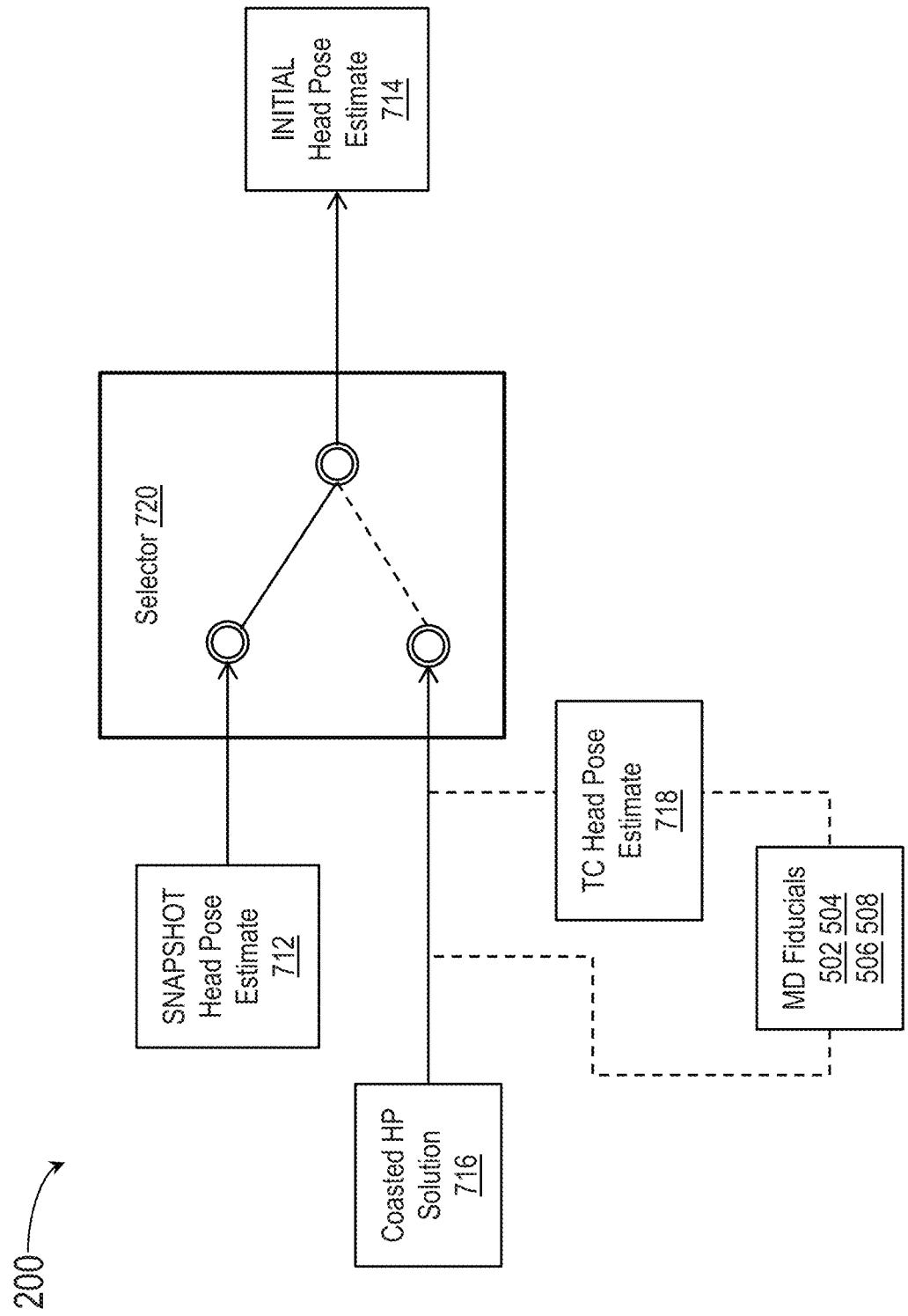
FIG. 7B is a block diagram illustrating the selection of multiple candidate initial head pose estimates, in accordance with example embodiments of this disclosure.
Figure 7C:
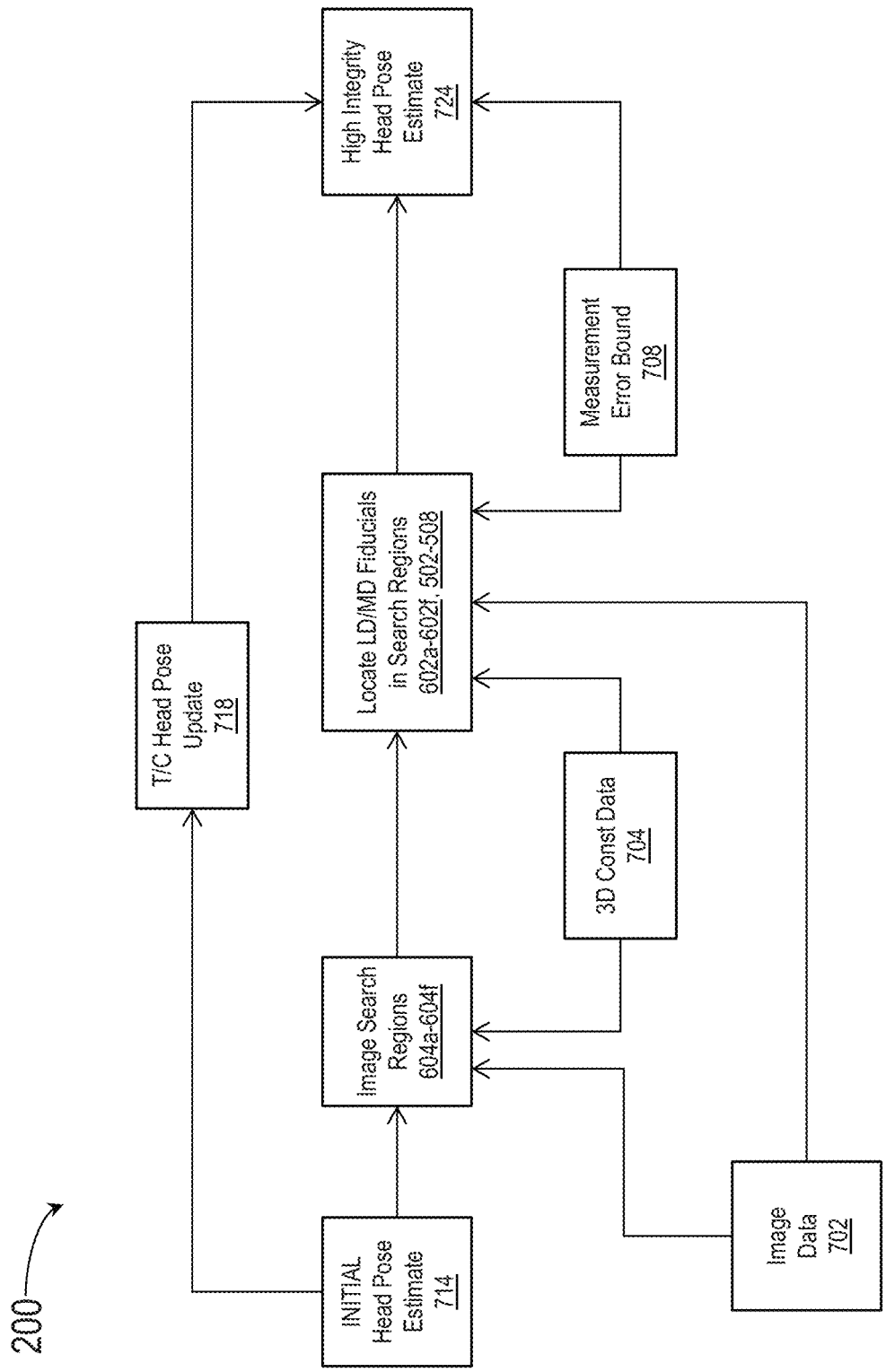
FIG. 7C is a block diagram illustrating the determination of a final head pose estimate, in accordance with example embodiments of this disclosure.

Referring now to FIGS. 7A-7C, block diagrams are shown, depicting the calculation of a head pose estimate by embodiments of the head tracker system 200.

Referring in particular to FIG. 7A, a block diagram for determining a high integrity head pose from medium-density fiducials is shown (e.g., medium-density fiducials 502, 504, 506, 508). In embodiments, an HWD camera (402, FIG. 4C) captures image data 702 corresponding to a 3D truth scene of an aircraft cockpit 400 (e.g., or other like environment surrounding the user/wearer of the HWD and wherein the medium-density fiducials 502-508 and/or low-density fiducials 602a-602f may be found) as captured by the 2D HWD camera. For example, the image data 702 captured by the HWD camera 402 may contain medium-density fiducials 502, 504, 506, 508 that are installed in the aircraft cockpit 400.

In embodiments, the head tracker system 200 may analyze the captured image data 702 to detect and identify medium-density fiducials 502, 504, 506, 508. For example, any medium-density fiducials 502, 504, 506, 508 detected within the 2D image data 702 may be mapped to 2D relative locations within the image data and compared with to the 3D positions and orientations of each medium-density fiducial (e.g., and relative marker geometry) as provided by constellation data 704. Based on correspondences between detected medium-density fiducials 502, 504, 506, 508 and their 3D real-world counterparts, the head tracker system 200 may determine a high-integrity head pose estimate 706. Further, the system 200 may generate a measurement error model 708 to bound possible errors in the high integrity head pose estimate 706.

In embodiments, based on the measurement error model 708 and the 3D constellation data 704 associated with the high integrity head pose estimate 706, the system 200 may check the medium-density fiducials 502, 504, 506, 508 detected within the image data 702 for other feasible correspondences 710 to the known 3D pose data of the medium-density fiducials. If, for example, the only feasible correspondence between 2D detected fiducials and 3D real-world fiducials is the correspondence informing the high integrity head pose estimate 706, the high integrity head pose estimate may be a valid snapshot head pose estimate 712. However, if other feasible correspondences 710 exist, if one or more ambiguous correspondences between detected medium density fiducials 502, 504, 506, 508 and their 3D constellation data 704, the system 200 must discard or resolve any ambiguous correspondences as disclosed above.

Referring now to FIG. 7B, the selection of the initial head pose estimate 714 from several candidate initial head pose estimates is depicted.

In embodiments, the system 200 may consider as a candidate initial head pose estimate the snapshot head pose estimate 712 determined as shown by FIG. 7A. For example, the snapshot head pose estimate 712 may be determined at a current time of validity based on a grouping of medium-density fiducials 502, 504, 506, 508 detected in the 2D image data 702. In some embodiments, the snapshot head pose estimate 712 may be preferred due to its temporal proximity to the display time of the corresponding image data and/or symbology by the HWD. However, in other embodiments, e.g., when multiple ambiguous feasible correspondences 710 exist, the snapshot head pose estimate 712 may be unavailable or unusable. Accordingly, the system 200 may determine alternative initial head pose estimates to prevent misalignment of images and symbology displayed by the HWD. For example, a candidate initial head pose estimate may be based on a coasted solution 716 (e.g., a snapshot head pose estimate from a prior time of validity which may be further propagated via extended Kalman filter (EKF) with pose rate data). In some embodiments, the coasted solution 716 may not account for any, or may account for an insufficient number of, medium-density fiducials 502, 504, 506, 508 detected at the current time of validity. Accordingly, the coasted head pose solution 716 may be outdated and thus associated with a broader error bound.

In some embodiments, the candidate initial head pose estimate may include a tightly coupled head pose estimate 718. For example, the tightly coupled head pose estimate may combine a coasted head pose solution 716 from a prior time of validity with any medium-density fiducials 502, 504, 506, 508 (e.g., and/or low-density fiducials (602a-602f, FIG. 6)) detected within the captured image data 702 to correct the coasted head pose solution.

In embodiments, the system 200 may include a selector 720 for determining a final initial head pose estimate 714 from the group of candidate initial head pose estimates 712, 716, 718. For example, if the snapshot head pose estimate 712 at the current time of validity is invalid or insufficiently accurate due to multiple feasible correspondences 710, the selector 720 may instead select the coasted solution 716. By way of anther example, if the snapshot head pose estimate 712 at the current time of validity is based on an insufficient number of medium-density fiducials 502, 504, 506, 508 detected in the captured image data 702, the selector 720 may a tightly coupled head pose estimate 718 based on the coasted solution 716 but incorporating any medium-density or low-density fiducials detected at the current time of validity. By way of another example, if no medium-density fiducials 502, 504, 506, 508 are detected in the captured image data 702, the selector 720 may select a strictly coasted (or, e.g., EKF-propagated with pose rate data) solution 716 corresponding to a prior time of validity.

Referring now to FIG. 7C, in embodiments the system 200 may determine a high integrity head pose estimate 724 (e.g., a final head pose solution including a high confidence error bound) based on the initial head pose estimate 714.

For example, the initial head pose estimate 714 may be of sufficient integrity for use as a high integrity head pose estimate 724 with a high-confidence error bound (e.g., if the initial head pose estimate is a snapshot head pose estimate 712 wherein no low-density fiducials 602a-602f were necessary to improve the initial head pose estimate). In some embodiments, the head tracker system 200 may further refine a tightly coupled head pose estimate 718 to enhance accuracy, e.g., via determination of image search regions 604a-604f wherein medium-density fiducials 502-508 or low-density fiducials 602a-602f may be found. For example, the initial head pose estimate 714 may allow the definition of feasible image search regions (e.g., search areas 604a-

604f) as candidate locations for low-density fiducials 602a-602f (or, in some embodiments, for medium-density fiducials 502, 504, 506, 508 not previously detected within the image data 702). For example, if the search areas 604a-604f for low-density fiducials 602a-602f do not overlap (e.g., ambiguous correspondences between the set of low density fiducials and their corresponding search areas), some or all low-density fiducials 602a-602f may be incorporated into the calculation of the high integrity head pose estimate 724.

Using the selected initial head pose estimate 714, search areas 604a-f for low-density fiducials 602a-602f in the 2D image data 702 may be determined. The search areas 604a-604f may be determined by comparing any detected medium-density fiducials 502-508 to 3D constellation data 704 in the data storage element 206, which may provide known 3D position and orientation data for any corresponding medium-density fiducials 502-508 as well as the set of low density fiducials, 602a-602f, such that correspondences between medium-density fiducials detected within the image data 702 and the 3D constellation data corresponding to the detected medium-density fiducials may inform the selection of search areas 604a-604f predicting where the low-density fiducials (and/or other medium-density fiducials) should be found within the image data.

In embodiments, when the system 200 determines search areas 604a-604f within the image data 702, medium-density fiducials 502, 504, 506, 508 and/or low-density fiducials 602a-602f may be detected within the search areas 604a-f based on the measurement error model 708, which may inform the size and shape of the determined search areas. For example, if the low-density fiducials 602a-602f and/or medium-density fiducials 502, 504, 506, 508 are found within their prescribed search areas 604a-604f, the initial head pose estimate 714 may reflect sufficient accuracy and/or integrity for use as a high integrity head pose estimate 724 by a broader variety of safety-critical applications. For example, if found, the medium-density fiducials 502, 504, 506, 508 and/or low-density fiducials 602a-f may validate the initial head pose estimate 714 as a high integrity head pose estimate 724.

Similarly, if the medium-density fiducials 502, 504, 506, 508 and/or low-density fiducials 602a-602f are not found inside their prescribed search areas 604a-604f, the initial head pose estimate 714 may not be sufficiently accurate or have sufficient integrity to be used as a high integrity head pose estimate 724 by a given application. In some embodiments, if insufficient medium-density fiducials 502-508 and/or low-density fiducials 602a-602f are detected within the image data 702, such that a high-integrity snapshot head pose 724 cannot be estimated, the initial head pose estimate 714 may instead be refined (based on any medium-density or low-density fiducials the system 200 was able to detect) according to a tightly coupled head pose estimate 718.

Referring now to FIGS. 8A through 8D, a method 800 for determining a head pose solution and corresponding integrity bound may be implemented by the head tracker system 200 of an HWD and may include the following steps. In embodiments, the memory 204 may store the method 800 disclosed herein as program instructions executable by the processor 202.

Figure 8A:
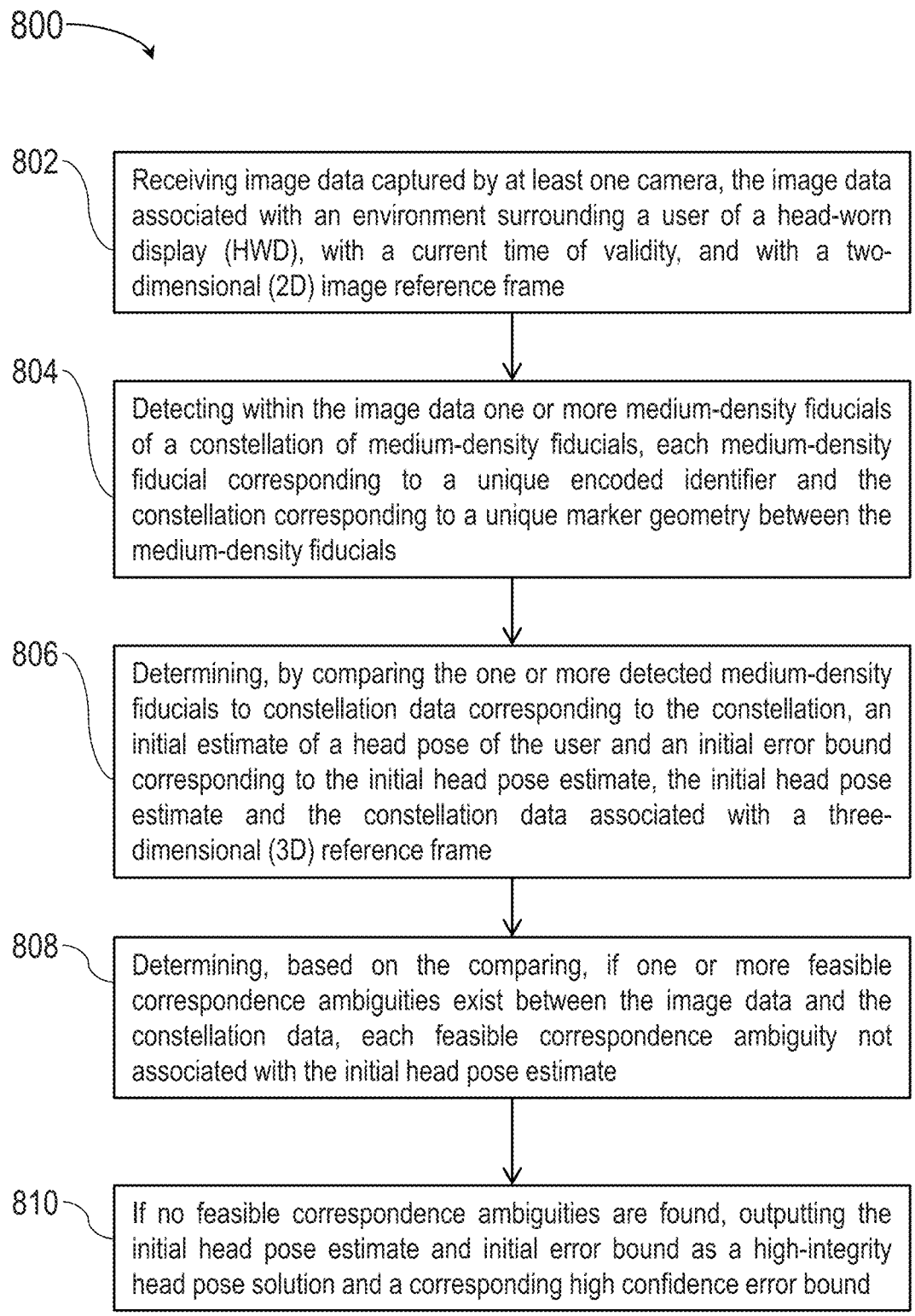

Referring to FIG. 8A, at a step 802 the system receives image data captured by one or more cameras oriented at an aircraft environment, e.g., a cockpit where the wearer of the HWD may be found. Image data may be current (e.g., current time of validity) and in a two-dimensional (2D) camera reference frame.

At a step 804, the head tracker system detects fiducial markers within the image data. For example, the image data may include a constellation of three or more medium-density fiducials, or fiducial markers including unique encoded identifiers but not so densely encoded as to satisfy correspondence integrity requirements by themselves. Each constellation and medium-density fiducial is associated with constellation data stored to memory, including (in a three-dimensional (3D) marker reference frame) a known position and orientation of each medium-density fiducial, the encoded identifier of each medium-density fiducial, and a unique marker geometry, or unique relative position and orientation relationships between the medium-density fiducials. The environment may additionally include low-density fiducials, which are not uniquely encoded (e.g., they may share a common identifier) but have unique positions and are distinctly encoded so as to be detectable against the background environment.

At a step 806, the head tracker system determines an initial estimate of the head pose of the HWD wearer by comparing any fiducials detected in the 2D image data to the corresponding 3D constellation data. The initial head pose estimate includes an initial error bound (integrity bound). For example, the initial head pose estimate may be a snapshot head pose estimate based solely on a sufficient number (e.g., three or more) medium-density fiducials detected within a single captured image. In some embodiments, the initial head pose estimate may include a coasted high integrity head pose solution from a prior time of validity (which may additionally be propagated forward to the current time of validity via extended Kalman filter (EKF) with pose rate data). In some embodiments (e.g., if an insufficient number of medium-density fiducials are detected at the current time of validity to support a snapshot head pose estimate), the initial head pose estimate may be a tightly coupled head pose update based on a prior coasted solution and any medium-density or low-density fiducials detected at the current time of validity, as compared with the corresponding 3D constellation data.

At a step 808, the head tracker system determines if any ambiguous correspondences exist between the 2D image data and 3D constellation data, and if so if any ambiguous correspondences represent feasible alternatives to the correspondences informing the initial head pose estimate.

At a step 810, if no feasible correspondence ambiguities are found (e.g., if the integrity of the initial head pose estimate, detected medium-density fiducials, and underlying correspondences are validated), the head tracker system outputs the initial head pose estimate and initial error bound as a snapshot head pose solution and high-confidence error bound.

Referring also to FIG. 8B, the method 800 may include additional steps 812 through 816. At the step 812, the head tracker system identifies, based on an initial head pose estimate with a high confidence error bound, search areas within the 2D image data. For example, based on any medium-density fiducials initially detected, and/or the initial head pose estimate based thereon, the search areas represent where additional medium-density or low-density fiducials should be found within the image data.

At a step 814, the head tracker system attempts to detect medium-density and low-density fiducials within their predicted search areas.

At the step 816, the head tracker system refines the initial head pose estimate and/or the initial error bound based on the identified search areas. For example, additional medium-density and low-density fiducials detected within their corresponding search areas (i.e., where the initial head pose estimate says they should be) may enhance the accuracy of the initial head pose estimate. Similarly, if correspondence ambiguities are found between fiducial markers and their corresponding search areas, e.g., if a particular fiducial may be located within one or more overlapping search areas, the accuracy of the initial head pose estimate will be adversely affected and the correspondence ambiguities must either be discarded (if possible) or accounted for in the final head pose solution and error bound (see, e.g., FIGS. 8C and 8D). In some embodiments, the refined initial head pose estimate may be a coasted head pose solution from a prior time of validity, which may include extended Kalman filter (EKF) propagation forward in time with pose rate data, or a tightly coupled pose update based on a coasted head pose solution and currently detected fiducials (e.g., if an insufficient number of fiducials were detected to support a snapshot head pose estimate).

Figure 8C:
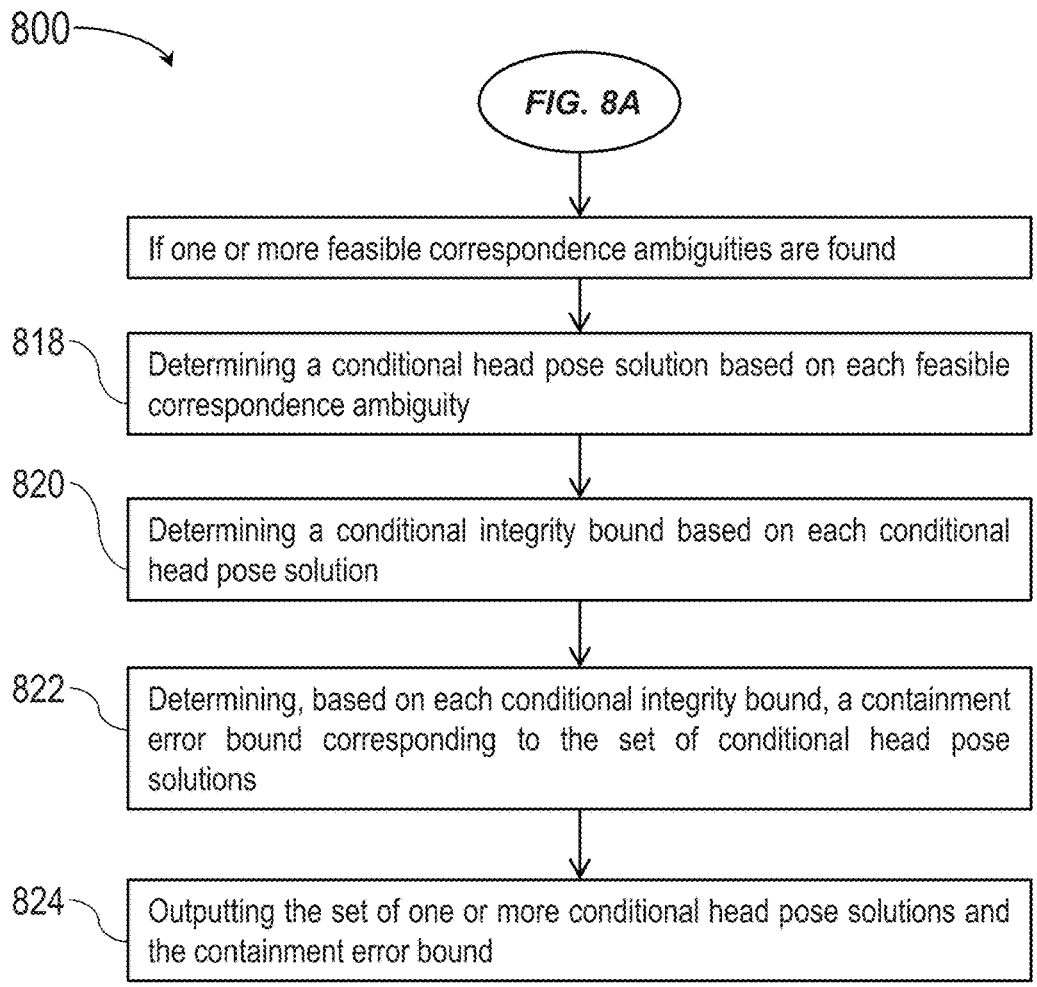

Referring also to FIG. 8C, if feasible correspondence ambiguities are identified, the method 800 may include additional steps 818 through 824.

At the step 818, the head tracker system determines a conditional head pose solution based on each feasible correspondence ambiguity, e.g., based on the premise that said correspondence ambiguity is indicative of a correct correspondence.

At a step 820, the head tracker system determines a conditional error bound (integrity bound) based on each conditional head pose solution.

At a step 822, the head tracker system determines a containment error bound based on the set of conditional error bounds, the containment error bound bounding the probability that the set of feasible correspondence ambiguities (and conditional head pose solutions based thereon) includes the correct correspondence and head pose solution.

At the step 824, the head tracker system outputs as a final solution the set of conditional head pose solutions and the corresponding containment error bound.

Figure 8D:
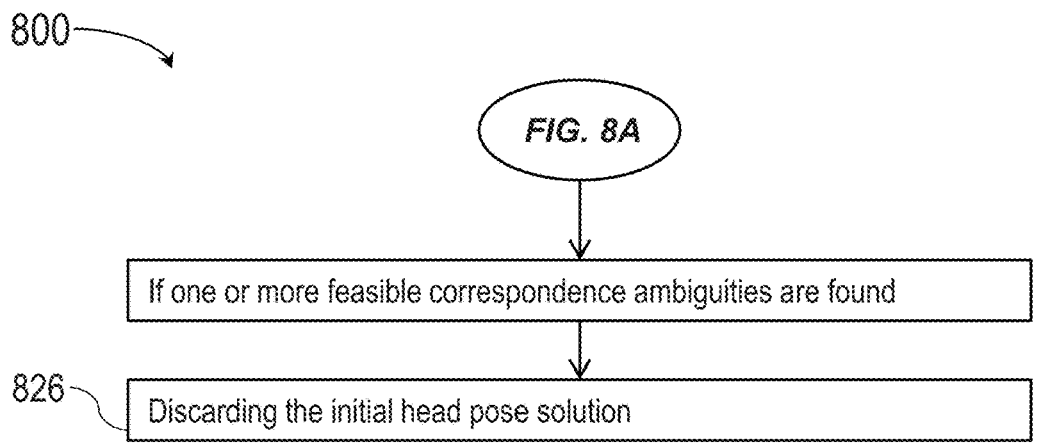

Referring also to FIG. 8D, if feasible correspondence ambiguities are identified, the method 800 may include an additional step 826.

At the step 826, the head tracker system discards the initial head pose estimate. For example, the head tracker system may select an alternative head pose estimate, e.g., a coasted or tightly coupled head pose solution refinable to a higher level of accuracy.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A head tracking system for a head worn display (HWD), comprising:
   at least one camera configured to capture two-dimensional (2D) image data of an environment associated with a mobile platform and with a wearer of the HWD, the 2D image data associated with an image reference frame;
   at least one constellation of three or more medium-density fiducials disposed within the environment, each medium-density fiducial corresponding to a unique encoded identifier;
   at least one low-density fiducial disposed within the environment, each low-density fiducial sharing a common encoded identifier;
   at least one memory configured for storing:
   processor-executable instructions;
   and
   constellation data comprising:
   a known position and orientation (pose) of each medium-density fiducial and each low-density fiducial relative to a three-dimensional (3D) reference frame;
   and
   a marker geometry associated with at least one of a position and an orientation of each medium-density fiducial and each low-density fiducial relative to each other medium-density fiducial and low-density fiducial in a marker reference frame;
   and
   at least one processor in data communication with the at least one camera and the memory, the processor configurable by the processor-executable instructions to:
   receive the 2D image data from the at least one camera;
   detect at least one of a medium-density fiducial or a low-density fiducial within the image data, each detected medium-density and low-density fiducial associated with a pixel location relative to the image data;
   determine, by comparing the at least one detected medium-density or low-density fiducial to the constellation data, (1) at least one initial estimate of a head pose of the wearer relative to the 3D reference frame and (2) an initial error bound corresponding to the at least one initial head pose estimate based on:
   the unique encoded identifiers of the detected medium-density fiducials;
   and
   the marker geometry of the detected medium-density and low-density fiducials;
   determine, based on the comparing, if one or more feasible correspondence ambiguities exist between the image data and the constellation data, each feasible correspondence ambiguity not associated with the initial head pose estimate;
   and
   if no feasible correspondence ambiguities are found, outputting the initial head pose estimate and the initial error bound as a high-integrity head pose solution and a corresponding high confidence error bound.

2. The head tracking system of claim 1, wherein the at least one processor is configured to output the initial head pose estimate and the initial error bound as a high-integrity snapshot head pose solution and a corresponding high confidence error bound if at least three medium-density fiducials were detected in the image data.

3. The head tracking system of claim 1, wherein the at least one initial head pose estimate includes at least one of:
a coasted high integrity head pose solution corresponding to a prior time of validity;
or
a tightly coupled head pose update based on the coasted high integrity head pose solution and at least one of a detected medium-density fiducial or a detected low-density fiducial.

4. The head tracking system of claim 1, wherein the at least one processor is configured to:
reproject the captured image data into the constellation data;
and
determine if one or more feasible correspondence ambiguities exist between the one or more detected medium-density or low-density fiducials and the 3D constellation data based on the reprojecting.

5. The head tracking system of claim 1, wherein the at least one processor is configured to:
identify, based on one or more of the initial head pose estimate or the initial error bound, one or more search areas within the image data;
detect, within the one or more search areas, at least one of a medium-density fiducial or a low-density fiducial;
and
refining one or more of the initial head pose estimate or the initial error bound based on the at least one detected medium-density fiducial or low-density fiducial.

6. The head tracking system of claim 5, wherein the at least one processor is configured to determine if one or more correspondence ambiguities exist between the image data and the constellation data by identifying at least one ambiguous correspondence between one or more of an identified search area and the corresponding-detected medium-density or low-density fiducial.

7. The head tracking system of claim 1, wherein the at least one processor is configured to, if one or more feasible correspondence ambiguities are found:
determine a conditional head pose solution based on each feasible correspondence ambiguity;
determine a conditional integrity bound based on each conditional head pose solution;
determine, based on each conditional integrity bound, a containment error bound corresponding to the set of one or more conditional head pose solutions;
and
output the set of one or more conditional head pose solutions and the containment error bound.

8. The head tracking system of claim 1, wherein the at least one processor is configured to, if one or more feasible correspondence ambiguities are found, discard the initial head pose solution.

9. The head tracking system of claim 1, wherein:
the at least one camera is attached to the HWD;
and
the at least one medium-density fiducial and the at least one low-density fiducial are attached to the mobile platform.

10. The head tracking system of claim 1, wherein:
the at least one camera is attached to the environment;
and
the at least one medium-density fiducial and the at least one low-density fiducial are attached to the wearer.

11. A method for high-integrity head pose estimation, the method comprising:
receiving image data captured by at least one camera, the image data associated with an environment surrounding a user of a head-worn display (HWD), with a current time of validity, and with a two-dimensional (2D) image reference frame;
detecting within the image data at least one of a medium-density fiducial and a low-density fiducial of a constellation of medium-density and low-density fiducials, wherein:
each medium-density fiducial corresponds to a unique encoded identifier and to a known position and orientation (pose) relative to a three-dimensional (3D) reference frame;
each low-density fiducial shares a common encoded identifier and corresponds to a known pose relative to the 3D reference frame;
and
3D constellation data corresponding to the constellation includes a marker geometry associated with at least one of a position and an orientation of each medium-density fiducial and each low-density fiducial relative to each other medium-density fiducial and low-density fiducial in a common marker frame;
determining, by comparing the one or more detected low-density and medium-density fiducials to the constellation data, an initial estimate of a head pose of the user and an initial error bound corresponding to the initial head pose estimate associated with the 3D reference frame based on:
the unique encoded identifiers of the detected medium-density fiducials;
and
the marker geometry of the detected low-density and medium-density fiducials;
determining, based on the comparing, if one or more feasible correspondence ambiguities exist between the image data and the constellation data, each feasible correspondence ambiguity not associated with the initial head pose estimate;
and
if no feasible correspondence ambiguities are found, outputting the initial head pose estimate and initial error bound as a high-integrity head pose solution and a corresponding high confidence error bound.

12. The method of claim 11, wherein outputting the initial head pose estimate and initial error bound as a high-integrity head pose solution and a corresponding high confidence error bound includes:
outputting the initial head pose estimate and initial error bound as a high-integrity snapshot head pose solution and a corresponding high confidence error bound if at least three medium-density fiducials were detected in the image data.

13. The method of claim 11, wherein determining an initial estimate of a head pose of the user and an initial error bound corresponding to the initial head pose estimate includes:
determining the initial head pose estimate corresponding to the current time of validity based on a coasted high integrity head pose solution corresponding to a prior time of validity.

14. The method of claim 13, wherein determining the initial head pose estimate corresponding to the current time of validity based on a coasted high integrity head pose solution corresponding to a prior time of validity includes:

refining the coasted high integrity head pose solution based on the one or more detected medium-density or low-density fiducials.

15. The method of claim 11, wherein determining, based on the comparing, if one or more feasible correspondence ambiguities exist between the 2D image data and the 3D constellation data includes:
    reprojecting the captured 2D image data into the 3D constellation data;
    and
    assessing the feasibility of each correspondence between the one or more detected medium-density and low-density fiducials and the 3D constellation data based on the reprojecting.

16. The method of claim 11, further comprising:
    determining, based on one or more of the initial head pose estimate or the initial error bound, one or more search areas within the 2D image data;
    detecting, within the one or more search areas, at least one of a medium-density fiducial or a low-density fiducial;
    and
    refining one or more of the initial head pose estimate or the initial error bound based on the at least one detected medium-density fiducial or low-density fiducial.

17. The method of claim 16, wherein determining, based on the comparing, if one or more feasible correspondence ambiguities exist between the 2D image data and the 3D constellation data includes:
    identifying at least one ambiguous correspondence between the detected medium-density or low-density fiducial and a corresponding search area.

18. The method of claim 11, further comprising:
    if one or more feasible correspondence ambiguities are found:
        determining a conditional head pose solution based on each feasible correspondence ambiguity;
        determining a conditional integrity bound based on each conditional head pose solution;
        determining, based on each conditional integrity bound, a containment error bound corresponding to the set of one or more conditional head pose solutions;
        and
        outputting the set of one or more conditional head pose solutions and the containment error bound.

19. The method of claim 11, further comprising:
    if one or more feasible correspondence ambiguities are found, discarding the initial head pose solution.

* * * * *